United States Patent
Chen

(10) Patent No.: US 9,203,562 B2
(45) Date of Patent: Dec. 1, 2015

(54) COOPERATING TIMER AND RETRANSMISSION COUNTER FOR BUFFER MANAGEMENT IN A HARQ WIRELESS NETWORK

(75) Inventor: Yih-Shen Chen, Hsinchu (TW)

(73) Assignee: MEDIATEK INC. (TW)

( * ) Notice: Subject to any disclaimer, the term of this patent is extended or adjusted under 35 U.S.C. 154(b) by 1005 days.

(21) Appl. No.: 12/380,538

(22) Filed: Feb. 28, 2009

(65) Prior Publication Data

US 2009/0168920 A1 Jul. 2, 2009

Related U.S. Application Data

(60) Provisional application No. 61/034,512, filed on Mar. 7, 2008.

(51) Int. Cl.
  *H04L 27/00* (2006.01)
  *H04L 1/18* (2006.01)
(52) U.S. Cl.
  CPC ............ *H04L 1/1835* (2013.01); *H04L 1/1851* (2013.01)
(58) Field of Classification Search
  CPC .................................................... H04L 1/1835
  See application file for complete search history.

(56) References Cited

U.S. PATENT DOCUMENTS

| 6,473,399 | B1 | 10/2002 | Johansson et al. | ............ | 370/229 |
| 6,901,063 | B2 | 5/2005 | Vayanos et al. | ............... | 370/335 |
| 7,103,817 | B1 * | 9/2006 | Choksi | ........................... | 714/748 |
| 7,921,348 | B2 | 4/2011 | Seidel et al. | .................. | 714/751 |
| 2003/0161323 | A1 * | 8/2003 | Harada et al. | ............ | 370/395.21 |
| 2004/0037224 | A1 | 2/2004 | Choi et al. | ..................... | 370/235 |
| 2005/0201343 | A1 * | 9/2005 | Sivalingham et al. | ........ | 370/338 |

(Continued)

FOREIGN PATENT DOCUMENTS

| CN | 1864362 A | 8/2003 |
| JP | 2003069613 | 8/2001 |
| JP | 2005328317 A | 11/2005 |
| JP | 2007502558 A | 2/2007 |
| WO | WO 2008025232 | 8/2006 |

OTHER PUBLICATIONS

International Search Report and Written Opinion of International Search Authority for PCT/CN2009/070660 dated May 21, 2009 (10 pages).

(Continued)

*Primary Examiner* — John Blanton
(74) *Attorney, Agent, or Firm* — Imperium Patent Works; Zheng Jin; Darien Wallace

(57) ABSTRACT

In a Hybrid Automatic Repeat ReQuest (HARQ) communication system, a receiver receives from a transmitter a HARQ sub-burst. A retransmission counter (RE_TX_CNT) in the receiver is incremented if either: (i) the receiver cannot decode the sub-burst, or (ii) no retransmission of the sub-burst is received within a Predetermined Retransmission Delay (PRD) interval. If RE_TX_CNT reaches a Maximal Retransmission Count (MAX_RE_CNT), then information for the sub-burst that was previously stored for HARQ purposes in a soft combining buffer in the receiver is flushed. Parameters that set the PRD interval and the MAX_RE_CNT value are pre-negotiated between the transmitter and the receiver. In another embodiment, if a novel timer in the receiver indicates that a first threshold time has elapsed after receipt of an undecodable HARQ transmission then buffered information is marked, whereas if the timer indicates that a second threshold time has elapsed then the marked information is flushed.

11 Claims, 16 Drawing Sheets

NOVEL HARQ "WAIT_TX_CNT" AND "RE_TX_CNT"

(56) References Cited

U.S. PATENT DOCUMENTS

| | | | |
|---|---|---|---|
| 2005/0249118 A1* | 11/2005 | Terry et al. | 370/235 |
| 2005/0276266 A1* | 12/2005 | Terry | 370/394 |
| 2006/0092972 A1 | 5/2006 | Petrovic et al. | 370/208 |
| 2007/0106924 A1* | 5/2007 | Seidel et al. | 714/748 |
| 2007/0259665 A1* | 11/2007 | Chiu et al. | 455/436 |
| 2007/0300120 A1* | 12/2007 | Kim et al. | 714/749 |
| 2008/0075042 A1 | 3/2008 | Shih | 370/330 |
| 2008/0107053 A1* | 5/2008 | Kim et al. | 370/310 |
| 2008/0285491 A1* | 11/2008 | Parkvall et al. | 370/310 |
| 2009/0168770 A1* | 7/2009 | Mohanty | 370/389 |

OTHER PUBLICATIONS

JPOA, for JP application 2010-549005, dated May 30, 2012 (1 page).

Translation of JPOA, for JP application 2010-549005, dated May 15, 2012 (3 pages).

3GPP TSG-RAN WG2#45 meeting, R2-042450, Panasonic, "HARQ Protocol Issues", Nov. 15-19, 2004, Shin Yokohama, Japan (5 pages).

SIPO, the First Examination Opinion of Chinese patent application 200980000303.0, dated Apr. 28, 2012. (12 pages).

Taiwan IPO has prepared the Search Report for Taiwan patent application 098107243 dated Jun. 19, 2013 (12 pages).

* cited by examiner

HARQ RETRANSMISSION SCHEME

POSSIBLE FRAME FORMAT

POSSIBLE TWICE-TOGGLING PROBLEM

POSSIBLE BUFFER OVERFLOW PROBLEM
IN ASYNCHRONOUS DL HARQ

SITUATION #1
(PRIOR ART TIMER)

SITUATION #2
(PRIOR ART TIMER)

INCREMENT "RE_TX_CNT" IF:

A) "PRD" INTERVAL IS EXCEEDED AFTER A NACKED TRANSMISSION ("WAIT_TX_CNT" TIMER EXPIRES), OR

B) A RETRANSMISSION IS RECEIVED THAT DOES NOT RESULT IN SUCCESSFUL DECODING OF THE SUB-BURST.

IF "RE_TX_CNT" REACHES A "MAX_RE_CNT":

FLUSH UN-DECODABLE SUB-BURST FROM SOFT BUFFER AND RESET THE "RE_TX_CNT" COUNTER AND THE "WAIT_TX_CNT" TIMER.

MOBILE STATION OPERATION

FIG. 8

MOBILE STATION PROCESS FLOW AS LONG AS
NO DL HARQ MESSAGE IS RECEIVED

SITUATION #1
(RE_TX_CNT COUNTER AND WAIT_TX_CNT TIMER)

SITUATION #2
(RE_TX_CNT COUNTER AND WAIT_TX_CNT TIMER)

COOPERATING TIMER AND RETRANSMISSION COUNTER FOR BUFFER MANAGEMENT IN A HARQ WIRELESS NETWORK

CROSS REFERENCE TO RELATED APPLICATION

This application claims priority under 35 U.S.C. §119 from U.S. Provisional Application No. 61/034,512, entitled "Reception of DL HARQ For Broadband Wireless Access Network," filed on Mar. 7, 2008, the subject matter of which is incorporated herein by reference.

TECHNICAL FIELD

The disclosed embodiments relate to Hybrid Automatic Repeat ReQuest (HARQ) communication schemes and to related devices.

BACKGROUND

In a typical cellular telephone network, a user communicates using a handset. The handset is commonly referred to as a Mobile Station (MS). The mobile station is in bidirectional radio communication with a Base Station (BS), and the base station is a part of a network of base stations. The mobile station of a user may initially be within a communication region of a first base station and may be communicating with a first base station. Then, as the user moves, the mobile station moves out of range of the first base station and enters communication range of a second base station. The mobile station begins to communicate with the second base station. In this way, the user can remain in communication with the network of base stations as the user moves from base station communication region to base station communication region. Communication from the base station to the mobile station may be referred to as DownLink (DL) communication, whereas communication from the mobile station to the base station may be referred to as UpLink (UL) communication. Such a network of base stations and mobile stations is not limited to use in cellular telephone communications, but rather sees general utility in many different applications and in accordance with many different protocols and standards for many purposes, including for general high speed data communication purposes.

In some such networks, communications between base stations and mobile stations is subject to interference and loss of the data being communicated. A technique referred to as Hybrid Automatic Repeat ReQuest (HARQ) is therefore sometimes employed. In a standard Automatic Repeat ReQuest (ARQ) method, error detection bits are added to data to be transmitted. In Hybrid ARQ, error correction bits are also added. When the receiver receives a transmission, the receiver uses the error detection bits to determine if data has been lost. If it has, then the receiver may be able to use the error correction bits to recover (decode) the lost data. If the receiver is not able to recover the lost data using the error correction bits, then the receiver may use a second transmission of additional data (including more error correction information) to recover the data. Error correction can be performed by combining (soft combining) information from the initial transmission with additional information from one or more subsequent retransmissions. There are several types of HARQ systems. In some, a retransmission includes error correction and detection information, but no data. In other types of HARQ systems, a retransmission includes data as well as error detection and correction information.

FIG. 1 (Prior Art) is a simplified diagram that illustrates a HARQ technique. The upper row 1 of blocks includes data bits 2 and channel encoding bits 3. The channel encoding bits 3 in this example include error detection and error correction information. If data 2 is properly communicated from the transmitter to the receiver in a first transmission 4, then few of the channel encoding bits are required to recover the data at the receiver. Accordingly, in a first transmission 4, the data bits and only some of the channel encoding bits are communicated. If the data can be property recovered (decoded), then no more transmissions are necessary. If, however, the first transmission 4 is corrupted to such an extent that the data cannot be decoded at the receiver, then a second transmission 5 is attempted. In this technique, only some of the channel encoding bits that were not sent in the first transmission are sent in this second transmission because not all of the channel encoding bits are necessary for the receiver to decode the data. If the receiver receives second transmission 5 and can decode the data, then no more retransmissions are required. If, however, the receiver still cannot decode the data, then a third transmission 6 is performed. Similarly, a fourth transmission 7 may be performed. Each successive transmission communicates more and more of the channel encoding information and hopefully at some point in the retransmission sequence the receiver will be able to decode and recover the data without errors.

FIG. 2 (Prior Art) is a diagram that illustrates a structure of a frame in accordance with a communication protocol employing a HARQ technique. The frame structure of FIG. 2 is not an actual frame structure, but rather is a simplified illustration presented here for instructional purposes. The frame includes a downlink sub-frame 8 and an uplink sub-frame 9. The downlink sub-frame 8 is communicated from the base station to one or more mobile stations in communication range of the base station. The uplink sub-frame 9 is communicated from a mobile station back to the base station. There may be many mobile stations in communication range of the base station. In order for the mobile stations not to transmit uplink sub-frames at the same time and to interfere with each other, the base station includes a UL_MAP 10 in the downlink sub-frame. The UL-MAP 10 indicates to the mobile stations which particular mobile station is to communicate an uplink sub-frame, and when that mobile station is to transmit this sub-frame. As is known in the art, the units of the vertical axis represent various sub-channels that may be used for communication. The horizontal axis represents time extending from left to right. The downlink sub-frame is therefore followed in time by the uplink sub-frame. In one HARQ example, the base station communicates the first transmission 4 of FIG. 1. The DL-MAP 11 of the first transmission includes numerous information elements (IEs), as well as numerous bursts of data. Each burst includes one or more sub-bursts. In the diagram of FIG. 2, BURST#1 includes a first sub-burst (sub-burst#1). Sub-burst#1 includes a cyclic redundancy check (CRC) code 12. CRC code 12 is an error detection code. The receiver receives this first transmission 4, and uses the DL-MAP to determine where in the following part of the DL sub-frame the sub-burst#1 is found. The receiver then uses CRC code 12 to check the integrity of sub-burst#1. If the CRC check succeeds, then the data of the sub-burst#1 is determined to have been successfully communicated and no retransmission of the sub-burst#1 is necessary. The receiver responds by returning an ACKnowledgement (ACK) to the transmitter. The receiver communicates this ACK at a time in a following UL sub-frame. The time and place in the UL sub-frame was previously specified to the receiver by the transmitter in an IE of the UL-MAP. If, on the other hand, the receiver cannot properly decode the data as indicated by the CRC check failing, then the receiver returns a Negative ACKnowledgement (NACK) at the specified time and place in the UL sub-frame. In the example of FIG. 2, the ACK or NACK is returned in ACK channel 13 in uplink sub-frame 9. The diagram of FIG. 2 is simplified. It is to be understood that the actual UL sub-frame containing the ACK or NACK may be transmitted several frames following the frame that contained the data (sub-burst#1 in this example).

If the transmitter (Base Station) receives an ACK, then the transmitter does not retransmit the sub-burst because the data of the sub-burst was properly decoded. If, however, the transmitter receives a NACK, then the transmitter retransmits the sub-burst in the form of second transmission 5 to the receiver. This second retransmission 5, of course, occurs in a subsequent DL sub-frame. If the receiver then returns an ACK, the communication is completed. If the receiver returns a NACK, then the transmitter sends another retransmission 6 of the sub-burst. In the example of FIGS. 1 and 2, the transmitter may attempt three retransmissions (four transmissions total) before giving up on communicating the sub-burst data.

FIG. 3 (Prior Art) is a signal diagram of a problem referred to as a "twice-toggling" problem. In a signal diagram such as FIG. 3, time proceeds from top to bottom in the diagram. The base station uses a sequence number (AI_SN) communicated with a sub-burst to indicate whether the sub-burst is a retransmission of a previously transmitted sub-burst or is a transmission of a new sub-burst. If the AI_SN sequence number is the same as in a previous transmission, then the receiver considers the transmission to a retransmission of the previous sub-burst. If, however, the AI_SN sequence number is detected to have toggled, then the receiver considers the transmission to be a transmission of another sub-burst.

In the example of FIG. 3, the base station (BS) attempts a first transmission HARQ SUB_BURST#1 14 of sub-burst#1 to a mobile station (MS). The CRC check 15 fails, so the mobile stations returns a NACK 16. The BS receives the NACK, and responds by retransmitting the sub-burst#1 17. The transmission is a retransmission, so the AI_SN of the retransmission is a "1" and is the same as the AI_SN value of the initial transmission 14. The MS receives retransmission 17 and still cannot properly decode the data. The second CRC check 18 fails as indicated by the label (CRC NOK). Four transmissions of sub-burst#1 are attempted (the initial transmission, and three retransmissions), until the BS gives up at time 19.

After giving up at time 19, the BS attempts transmitting a second sub-burst, sub-burst#2 20. Because transmission 20 is a transmission of a sub-burst other than the first sub-burst#1, the sequence number AI_SN is toggled to be "0". This transmission 20 is, however, in this example not received by the mobile station. The star symbol 21 indicates that the transmission is not received. After a certain amount of time, when the BS does not receive either an ACK or a NACK, the BS attempts to send the sub-burst#2 once more in a retransmission 22. Retransmission 22 is also not received as indicated by star 23. After four attempts, the base station gives up attempting to send the second sub-burst#2.

The BS then attempts communicating a third sub-burst, sub-burst#3. Because this transmission 24 is a transmission of a new sub-burst, the AI_SN sequence number is again toggled to be a "1". Transmission 24 is received by the MS in this example. The mobile station erroneously attempts to combine transmission 24 with the collected information from the previously received sub-burst#1 transmissions because the AI_SN sequence number indicates that the sub-burst of transmission 24 is the same sub-burst as the sub-burst of the previously received sub-burst#1 transmissions. This "soft combining" error occurs because the MS did not receive any of the four attempted sub-burst#2 communications that had the AI_SN value of "0".

FIG. 4 (Prior Art) is a simplified diagram of a problem referred to as a "buffer overflow" problem. The BS initially transmits a sub-burst, sub-burst#1, in transmission 25. The MS cannot properly decode the data as indicated by the CRC check fail 26. Because the MS may perform soft combining with additional channel encoding information communicated later by the BS in accordance with the HARQ technique employed, the MS retains information from the first transmission 25 in a soft combining buffer in the MS, and returns a NACK 27. The BS receives the NACK and retransmits sub-burst#1 as illustrated. Cross-hatched box 28 represents the sub-burst#1 information present in the soft combining buffer in the receiver. The soft combining buffer has a fixed amount of memory space for storing information. This is indicated in FIG. 4 by the label "SOFT BUFFER SIZE". After three transmissions 25, 29 and 30, the fourth transmission 31 of sub-burst#1 is not received by the MS as indicated by star 32. The MS does not receive fourth transmission 31, and therefore continues to wait for the fourth transmission of the sub-burst#1. The MS therefore continues to retain the sub-burst#1 information 28 in its soft combining buffer for soft combining with sub-burst#1 information in an upcoming fourth-transmission. From the BS perspective, however, the fourth transmission of sub-burst#1 failed. The BS therefore gives up communicating sub-burst#1 and transmits sub-burst#2 in transmission 32. The MS receives sub-burst#2 transmission 33, but its CRC check fails. The MS therefore should store the sub-burst#2 information 34 in the soft combining buffer for future soft combining of subsequent sub-burst#2 retransmissions. The sub-burst#2 information 34 pushed onto the soft combining buffer is indicated in FIG. 4 by hatched box 34. Because the sub-burst#1 information 28 from the failed sub-burst#1 communication is still occupying space in the soft combining buffer, the buffer may overflow when the sub-burst#2 information 34 is stored into the buffer as illustrated. Some or all of the sub-burst#2 information to be stored will be lost, resulting in degraded future performance of the HARQ system.

To address these and other problems, timers are sometimes employed in HARQ systems. FIG. 5 (Prior Art) is a diagram that illustrates operation of a conventional MS timer in a first situation. The system is a type of system referred to as an "asynchronous retransmission" system in that the time intervals between transmission and retransmission attempts by the BS may be of different durations. There may be a relatively irregular time separations between retransmission attempts in such an "asynchronous retransmission" system. FIG. 5 illustrates a scenario involving relatively short separation times whereas FIG. 6 illustrates a scenario involving relatively long separation times. Operation of the timer is represented by the line 35, the bowtie symbol 36, and the left-pointing arrow 37. Line 35 indicates that the timer starts timing upon receipt by the MS of a first transmission 38 of sub-burst#1. Because sub-burst#1 cannot be properly decoded as indicated by the CRC check fail (CRC NOK) 39, the timer starts timing an interval. If sub-burst#1 is not properly decoded before this interval elapses, then the MS is to flush the sub-burst#1 information from its soft combining buffer in an attempt to solve a potential buffer overflow problem. In the situation of FIG. 5, however, the timer interval is so long that the sub-burst#3 transmission 40 occurs before the timer expires. The previously described twice-toggling problem therefore occurs in this situation. The undecodable transmission 40 of sub-burst#3 is received, the MS detects the AI_SN sequence number to match the AI_SN sequence number of the transmissions of sub-burst#1, and the MS incorrectly attempts to soft combine transmission 40 with information stored in its soft combining buffer for sub-burst#1. The BS must retransmit sub-burst#3 in a later transmission 41 in order for the MS to receive the sub-burst. This is undesirable.

FIG. 6 (Prior Art) is a diagram that illustrates operation of a conventional MS timer in an asynchronous HARQ retransmission system in a second situation. In the situation illustrated in FIG. 6, the timer is set to expire in time interval 42 if sub-burst#1 has not been properly decoded by time 43. In the illustrated situation, the second retransmission 44 does not reach the MS. The timer expires at time 43, and the MS flushes information stored for sub-burst#1 from its soft combining buffer. After this flushing, the BS later attempts to retransmit sub-burst#1 in transmission 45. Soft combining in the MS, however, fails because the MS had previously flushed its soft combining buffer of sub-burst#1 information. In a worst case scenario, transmission 45 is the fourth transmission of sub-burst#1, and the BS gives up attempting to communicate sub-burst#1. Accordingly, in the situation of FIG. 5 the MS timer expired undesirably late, whereas in the situation of FIG. 6 the MS timer expired undesirably early.

SUMMARY

In a system employing a Hybrid Automatic Repeat ReQuest (HARQ) communication scheme, a receiver (for example, a mobile station) receives from a transmitter (for example, a base station) a HARQ sub-burst transmission. In one specific example, the system is a wireless communication system that is compliant with the IEEE 802.16m standard.

In a first novel aspect, the receiver includes a wait transmission timer (WAIT_TX_CNT) as well as a retransmission counter (RE_TX_CNT). The retransmission counter (RE_TX_CNT) in the receiver is incremented if either: (i) the receiver cannot properly decode the HARQ sub-burst, or (ii) no retransmission of the HARQ sub-burst is determined to have been received by the receiver within a Predetermined Retransmission Delay (PRD) time interval. Within the receiver, the WAIT_TX_CNT timer is used to determine when and if the PRD time interval has expired. If the retransmission counter RE_TX_CNT in the receiver reaches a Maximal Retransmission Count (MAX_RE_CNT), then it is determined that information for the sub-burst that was previously stored in a soft combining buffer of the receiver for HARQ purposes should be flushed from the soft combining buffer. Parameters that set the PRD time interval and the MAX_RE_CNT value are negotiated between the transmitter and the receiver before the HARQ sub-burst transmissions occur. In concluding the negotiation, the transmitter communicates one or more parameters to the receiver that set the PRD time interval and the MAX_RE_CNT value in the receiver.

In a second novel aspect, the base station has a capability of transmitting a novel value (for example, a Retransmission Interval (RI) value) to the mobile station. The receiving mobile station is configured to use the novel value to set the PRD interval time at which the wait transmission timer (WAIT_TX_CNT) mechanism in the mobile station will expire if a HARQ sub-burst retransmission has not been received onto the mobile station from the base station within the PRD interval after receipt of a last transmission of the HARQ sub-burst. In one example, the novel value is transmitted from the base station in an IEEE compliant DSA-RSP transmission.

In a third novel aspect, an IEEE 802.16e compliant mobile station includes a timer mechanism, a soft combining buffer, and a processing mechanism. The timer mechanism (LOST_MAP_CNT) tracks an amount of time that has elapsed after receipt onto the mobile station of an undecodable HARQ sub-burst. The soft combining buffer stores, for possible future HARQ soft combining purposes, HARQ information of the undecodable HARQ sub-burst. The processing mechanism marks the HARQ information in the soft combining buffer if the elapsed time as indicated by LOST_MAP_CNT reaches a first threshold time (THR1). If upon receipt of an undecodable HARQ sub-burst the elapsed time as indicated by LOST_MAP_CNT has reached a second threshold time (THR2), then the processing mechanism avoids a possible soft buffer overflow by causing the soft buffer to flush the marked HARQ information prior to storing of additional HARQ sub-burst information into the soft buffer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 sets forth how the WAIT_TX_CNT timer and the RE_TX_CNT counter operate together in the signal sequence illustrated in FIG. 7.

DETAILED DESCRIPTION

Reference will now be made in detail to some embodiments of the invention, examples of which are illustrated in the accompanying drawings.

A wireless communication system includes a network of base stations (BS) and a plurality of mobile stations (MS) and also employs a Hybrid Automatic Repeat ReQuest (HARQ) technique. In one specific example, the wireless communication system comports with the Institute of Electrical and Electronics Engineers (IEEE) 802.16m, 802.16e, or OFDMA related standard.

Figure 7:
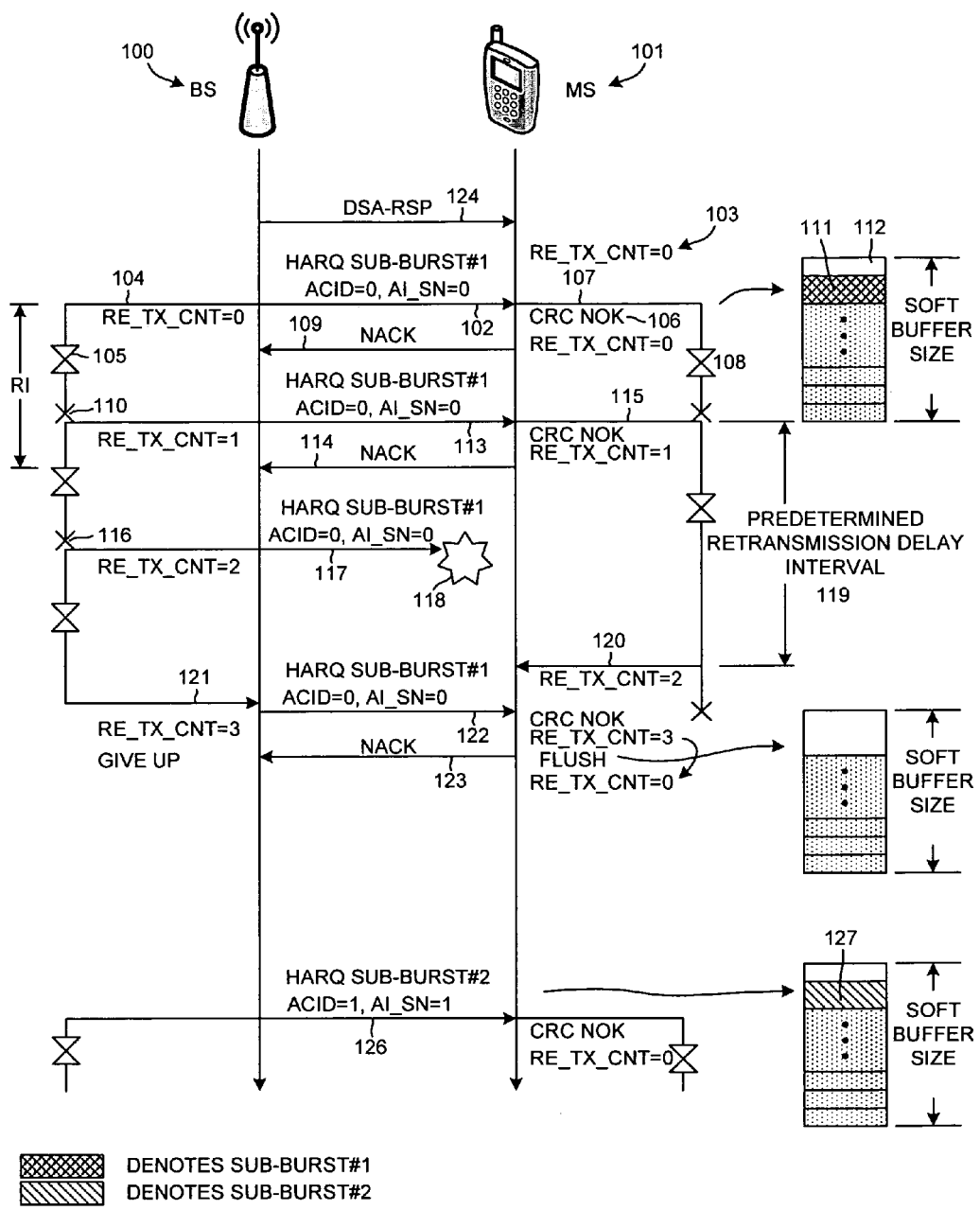
FIG. 7 is a signal diagram that illustrates operation of IEEE 802.16m compliant system in accordance with one novel aspect. The mobile station of the system realizes and includes a novel WAIT_TX_CNT timer that interoperates with a RE_TX_CNT counter.

FIG. 7 is a signal diagram that illustrates operation of an IEEE 802.16m compliant wireless communication system involving a base station 100 and a mobile station 101. Mobile station 100 employs a novel timer, referred to here as the "wait transmission counter" (WAIT_TX_CNT), as well as a retransmission counter (RE_TX_CNT). The timer and counter interoperate in a novel way as explained below and as schematically represented in FIG. 8.

Figure 1:
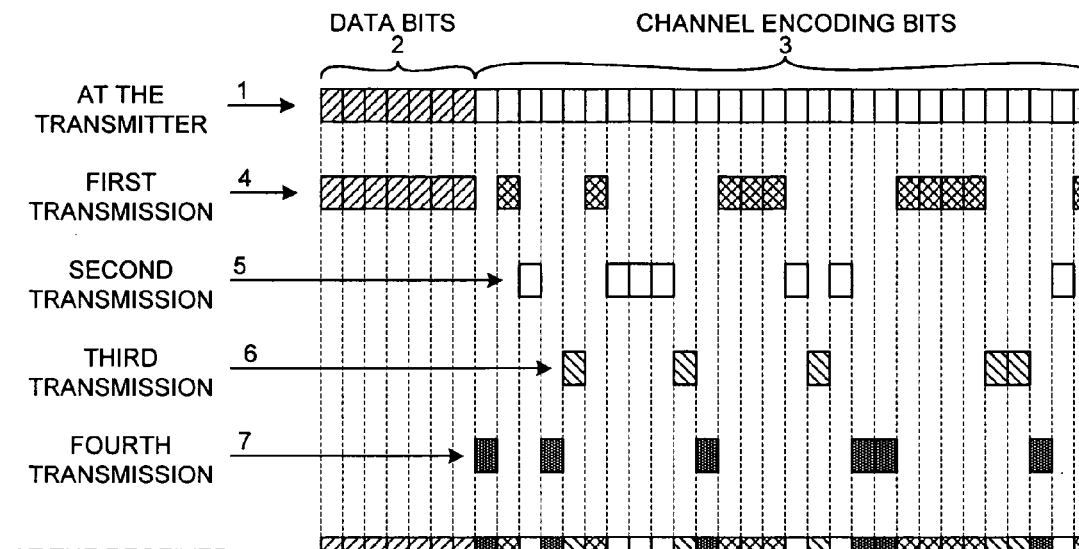
FIG. 1 (Prior Art) is a simplified diagram that illustrates a HARQ technique.
Figure 2:
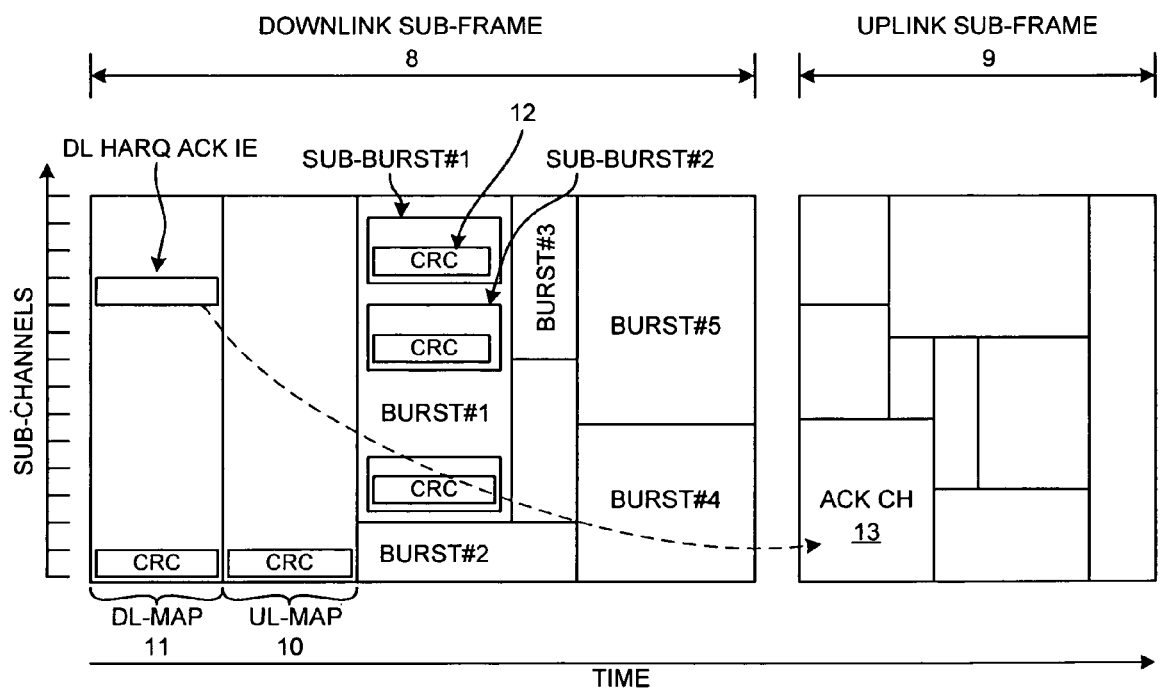
FIG. 2 (Prior Art) is a diagram that illustrates a structure of a frame that includes a HARQ sub-burst.
Figure 3:
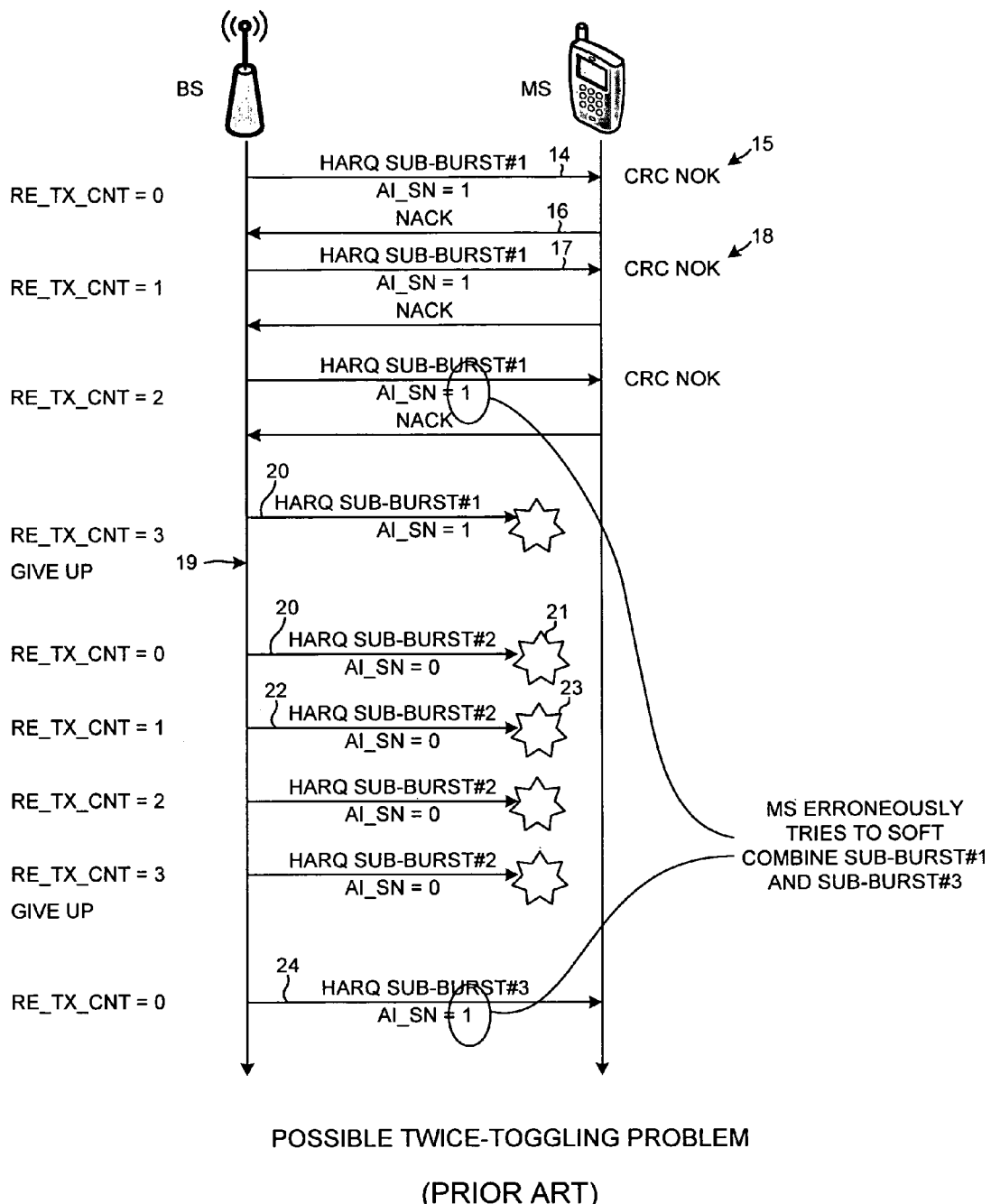
FIG. 3 (Prior Art) is a signal diagram of a problem referred to as a "twice-toggling" problem.

In the signal diagram of FIG. 7, time extends from top to bottom of the diagram. Initially, the base station and the mobile station negotiate and agree on a "Predetermined Retransmission Delay (PRD) interval" at which the WAIT_TX_CNT timer in the mobile station will expire. The PRD interval may be specified as a count number MAX_RE_DELAY. In addition, the base station and the mobile station negotiate and agree on a "Maximal Retransmission Count value" MAX_RE_CNT. The MAX_RE_CNT value determines a maximum number of retransmission attempts that can be made to communicate a sub-burst before the mobile station gives up and flushes previously stored sub-burst information from a soft combining buffer in the mobile station. In addition, the base station and mobile station negotiate and agree on a "retransmission interval (RI)." The retransmission interval RI is a parameter used by the base station and is the largest permissible time interval between successive retransmissions of a sub-burst. After the negotiation, the base station communicates the MAX_RE_DELAY value, the MAX_RE_CNT value, the RI value, a maximum number of HARQ processes, and an ACK/NCK delay to mobile station 101 in one or more downlink sub-frames. More particularly, these parameters may be communicated from the BS to the MS in an IEEE 802.16 compliant DSA-RSP MAC management message 124. Rather than communicating the PRD interval (in the form of a MAX_RE_DELAY value) in message 124, in some embodiments the PRD interval is a known function of the RI value. The PRD interval (in the form of the MAX_RE_DELAY value) is not communicated from the BS to the MS, but rather the RI value is communicated from BS to MS and the MS may calculate the PRD interval from the RI value. The frame structures employed to communicate these parameters may be of the general conventional form illustrated in FIG. 2 even though new parameters are being communicated.

Mobile station 101 receives the parameters and stores them for later use in engaging in communication with base station 100. This communication occurs prior to the time of the first HARQ sub-burst#1 transmission 102 of FIG. 7. Initially, prior to transmission 102, a retransmission counter RE_TX_CNT in the mobile station has a value of zero as illustrated in FIG. 7. The RE_TX_CNT=0" notation 103 in FIG. 7 represents this retransmission counter and its current value.

Next, the first transmission 102 of HARQ sub-burst#1 occurs. At this time, the base station starts a retransmission (RI) timer. Line 104 indicates the starting of this RI timer. The bowtie symbol 105 represents the RI timer. In the illustrated example, one of more communication sub-channels employed are noisy and not all information of transmission 102 is received at the mobile station. The mobile stations uses a Cyclic Redundancy Check (CRC) value transmitted with the sub-burst to check the integrity of the communicated sub-burst but the CRC check fails as indicated in FIG. 7 by the "CRC NOK" label 106. Because the transmission 102 is the first transmission of sub-burst#1, the retransmission counter RE_TX_CNT in mobile station 101 is not incremented, but rather remains at zero. Note that in FIG. 8, the RE_TX_CNT is to increment if the PRD interval is exceeded or if a retransmission (not a transmission, but a "re" transmission) is received that cannot be decoded.

The WAIT_TX_CNT timer in mobile station 101 is, however, started. Line 107 indicates the time when the WAIT_TX_CNT begins incrementing. The bowtie symbol 108 indicates the WAIT_TX_CNT timer. Because transmission 102 could not be decoded, the mobile station returns a Negative ACKnowledgement (NACK) 109 to the base station.

Because transmission 102 of the sub-burst#1 failed, the mobile station stores the first sub-burst#1 in a soft combining buffer for later combining with other sub-burst#1 information in accordance with a HARQ technique employed in IEEE 802.16m. The cross-hatched block 111 indicates the storing of the sub-burst#1 information into the soft combining buffer (also referred to as a "soft buffer"). The label "SOFT BUFFER SIZE" indicates the total amount of memory space in the soft buffer. In the example of FIG. 7, the white portion 112 at the top of the soft buffer represents free storage space remaining in the soft buffer.

Because first transmission 102 of sub-burst#1 failed, base station 100 attempts a retransmission 113 of the sub-burst. Retransmission 113 occurs prior to the expiration of RI timer 105, thereby halting the RI timer as indicated by the "X" symbol 110. The AI_SN sequence number of "0" for the retransmission is therefore the same as the AI_SN sequence number of "0" for the initial transmission in accordance with the IEEE 802.16m. Mobile station 101 receives retransmission 113 and attempts to decode the sub-burst#1 of the retransmission. The CRC check again fails as indicated by the label "CRC NOK". Due to the failure, the mobile station returns a NACK 114, and increments its retransmission counter RE_TX_CNT to be a "1" value. The novel WAIT_TX_CNT timer is again started as indicated by line 115.

The base station attempts to communicate a retransmission 117 of sub-burst#1. Retransmission 117 occurs before expiration of the RI timer, thereby halting the RI timer as indicated by "X" symbol 116. Retransmission 117, however, does not reach the mobile station in this example. The star symbol 118 represents the transmission being blocked or otherwise not reaching its intended recipient. The WAIT_TX_CNT timer therefore continues to increment until PRD interval 119 expires. The left pointing arrow 120 indicates the expiration of the WAIT_TX_CNT timer. The expiration of the timer causes the retransmission counter RE_TX_CNT in the mobile station to increment from "1" to "2". Because the RE_TX_CNT has not reached its maximum MAX_RE_CNT, the RE_TX_CNT is automatically restarted and begins timing another PRD interval.

In the example of FIG. 7, the base station did not receive an ACK or NACK as expected in response to the second retransmission 117. The RI timer expires when it reaches the RI value as indicated by the right pointing arrow 121. The retransmission scheme of FIG. 7 is "asynchronous" in that time intervals between transmission and retransmission attempts by the BS may be of different durations, and in the example illustrated the RI timer expires after retransmission 117.

The expiring of RI timer at time 121, the base station 100 attempts another retransmission 122 of sub-burst#1. Retransmission 122 does reach the mobile station but the CRC check fails so the mobile station returns a NACK 123. Receipt of a retransmission at the mobile station that cannot be decoded causes the RE_TX_CNT in the mobile station to be incremented. The RE_TX_CNT therefore increments from "2" to "3" upon receipt of retransmission 122. The mobile station's RE_TX_CNT value of "3" is, however, the MAX_RE_CNT value. In accordance with the test set forth in FIG. 8, the mobile station determines that MAX_RE_CNT has been reached and flushes the sub-burst#1 information from its soft combining buffer and resets the RE_TX_CNT to "0" as illustrated. The WAIT_TX_CNT timer is also reset but is not started.

Figure 4:
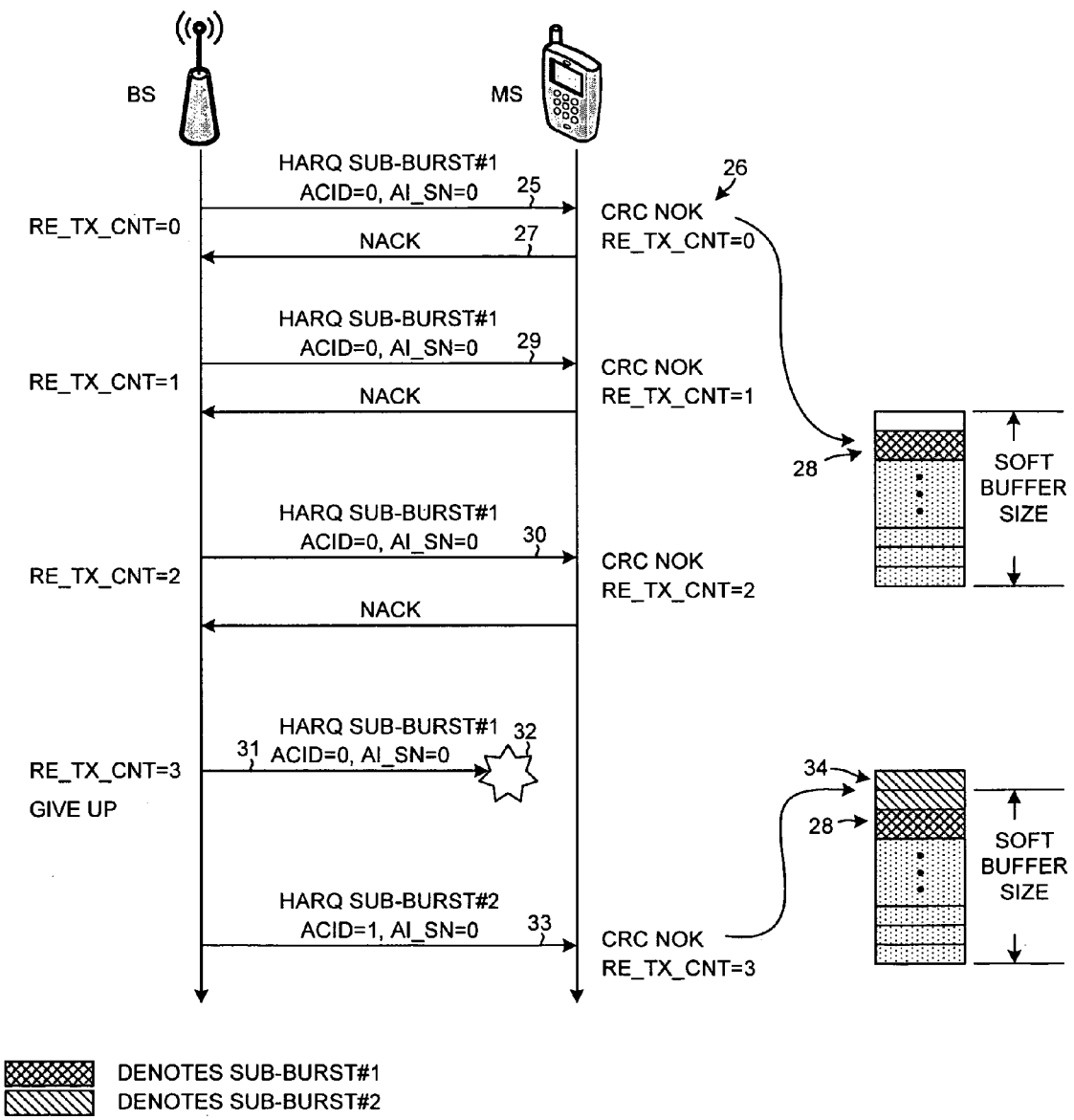
FIG. 4 (Prior Art) is a simplified diagram of a problem referred to as a "buffer overflow" problem.

NACK 123 is received at base station 100. Because the base station retransmission counter has a value of "3" at the time NACK 123 is received, the base station gives up attempting to communicate sub-burst#1. Next, base station 100 attempts to communicate the next sub-burst, sub-burst#2, in transmission 126. In the situation illustrated, the mobile station receives transmission 126 but again is unable to properly decode sub-burst#2. In accordance with the HARQ scheme employed, the mobile station stores sub-burst#2 into its soft combining buffer for possible later soft combining with later retransmissions of sub-burst#2. The hatched box 127 represents this sub-burst#2 information being stored into the soft combining buffer. In one advantageous aspect, note that the soft combining buffer does not overflow because the unusable sub-burst#1 information 111 had been previously flushed from the soft combining buffer, thereby making room for the storing of sub-burst#2 information 127 into the soft combining buffer when sub-burst#2 was determined to be undecodable. In contrast, in the prior art example of FIG. 4, the soft combining buffer overflowed because sub-burst#1 information 28 remained in the buffer at the time of receipt of sub-burst#2 transmission 32.

Figure 9:
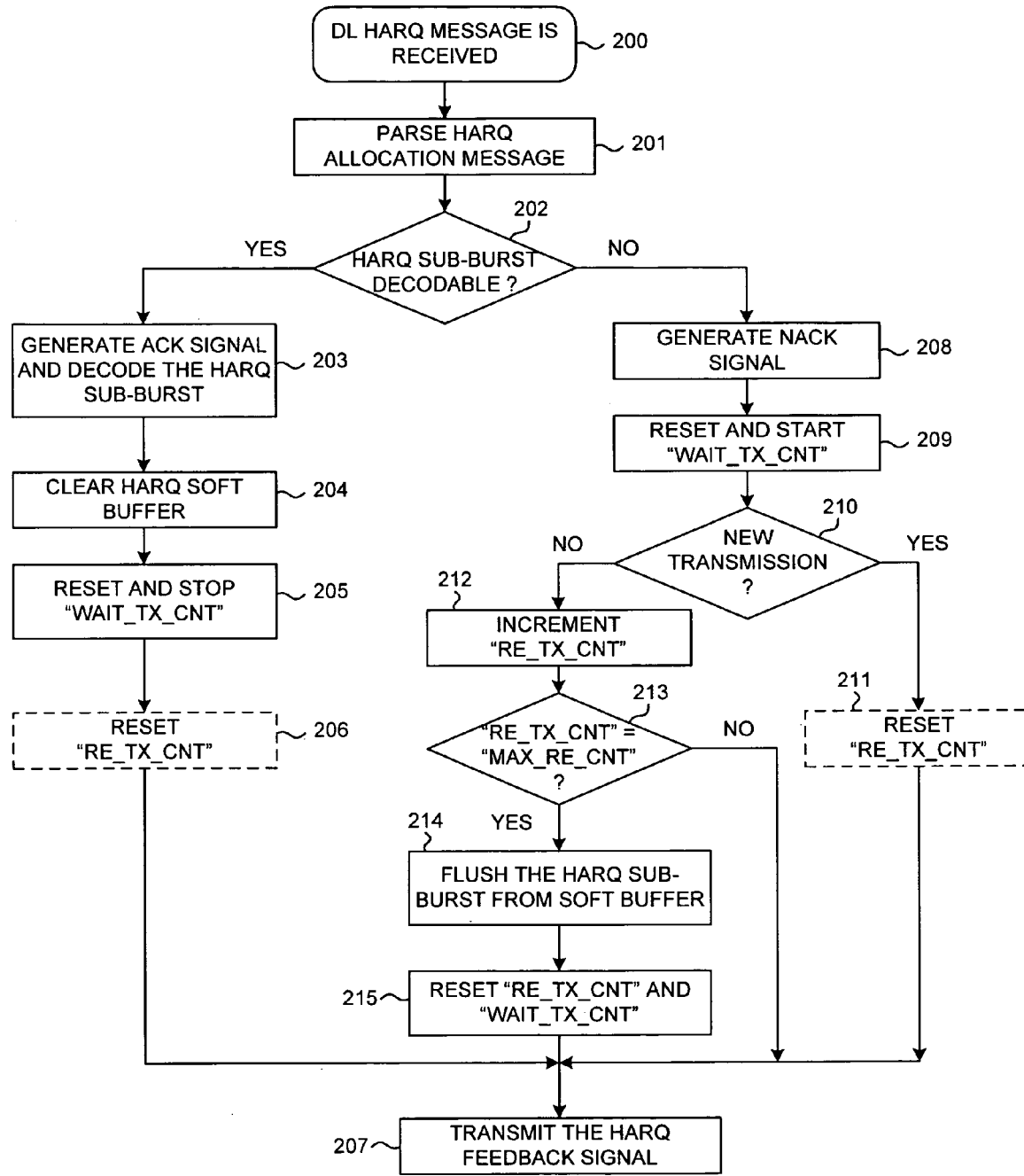
FIGS. 9 and 10 are flowcharts that set forth how the WAIT_TX_CNT timer and the RE_TX_CNT counter of the mobile station of FIG. 7 operate in the signal sequence illustrated in FIG. 7.

FIG. 9 is a flowchart that illustrates operation of the WAIT_TX_CNT timer and the RE_TX_CNT counter in mobile station 101 of FIG. 7 when a HARQ message is received. Initially, the mobile station receives the DL HARQ message (step 200) and parses the HARQ allocation message (step 201). The message is the "HARQ DL MAP IE" that contains multiple IEs. One of these IEs (DL_HARQ_Chase_SUBBURST_IE) communicates a specific allocation for a specific sub-burst. From this allocation information, the mobile station locates the specific sub-burst (for example, sub-burst#1) in the DL sub-frame and attempts (step 202) to decode the data of the sub-burst. If the sub-burst is decodable (the CRC check passes), then the mobile station generates an ACK (step 203), decodes the sub-burst, clears the soft combining buffer of any previously stored information for this particular sub-burst (step 204), resets and stops the WAIT_TX_CNT timer (step 205), and resets the RE_TX_CNT counter (step 206). These tasks may, for example, be performed by a baseband processor integrated circuit within a mobile communication device. The generated HARQ feedback signal (in this case, an ACK) is then transmitted (step 207). In one example, the transmitting occurs by the baseband processor communicating an instruction to another transceiver integrated circuit within the mobile communication device.

If the HARQ sub-burst is determined (step 202) to be undecodable (the CRC check failed), then the mobile station generates a NACK (step 208) and resets and starts the WAIT_TX_CNT timer (step 209). If the sub-burst is determined (step 210) to be an initial first transmission of the sub-burst (as opposed to a retransmission), then the RE_TX_CNT is reset (step 211) and the generated NACK is transmitted (step 207). If, however, the sub-burst is determined (step 210) to be a retransmission, then the RE_TX_CNT is incremented (step 212). If the incremented value of RE_TX_CNT is determined (step 213) to be the MAX_RE_CNT, then the soft combining buffer is flushed of any previously stored information of the sub-burst (step 214). RE_TX_CNT and WAIT_TX_CNT are reset (step 215) and the NACK is transmitted (step 207). If the incremented value of RE_TX_CNT is determined (step 213) not to be the MAX_RE_CNT, then the soft combining buffer is not flushed and the timer and counter are not reset, and the NACK is transmitted (step 207).

Figure 10:
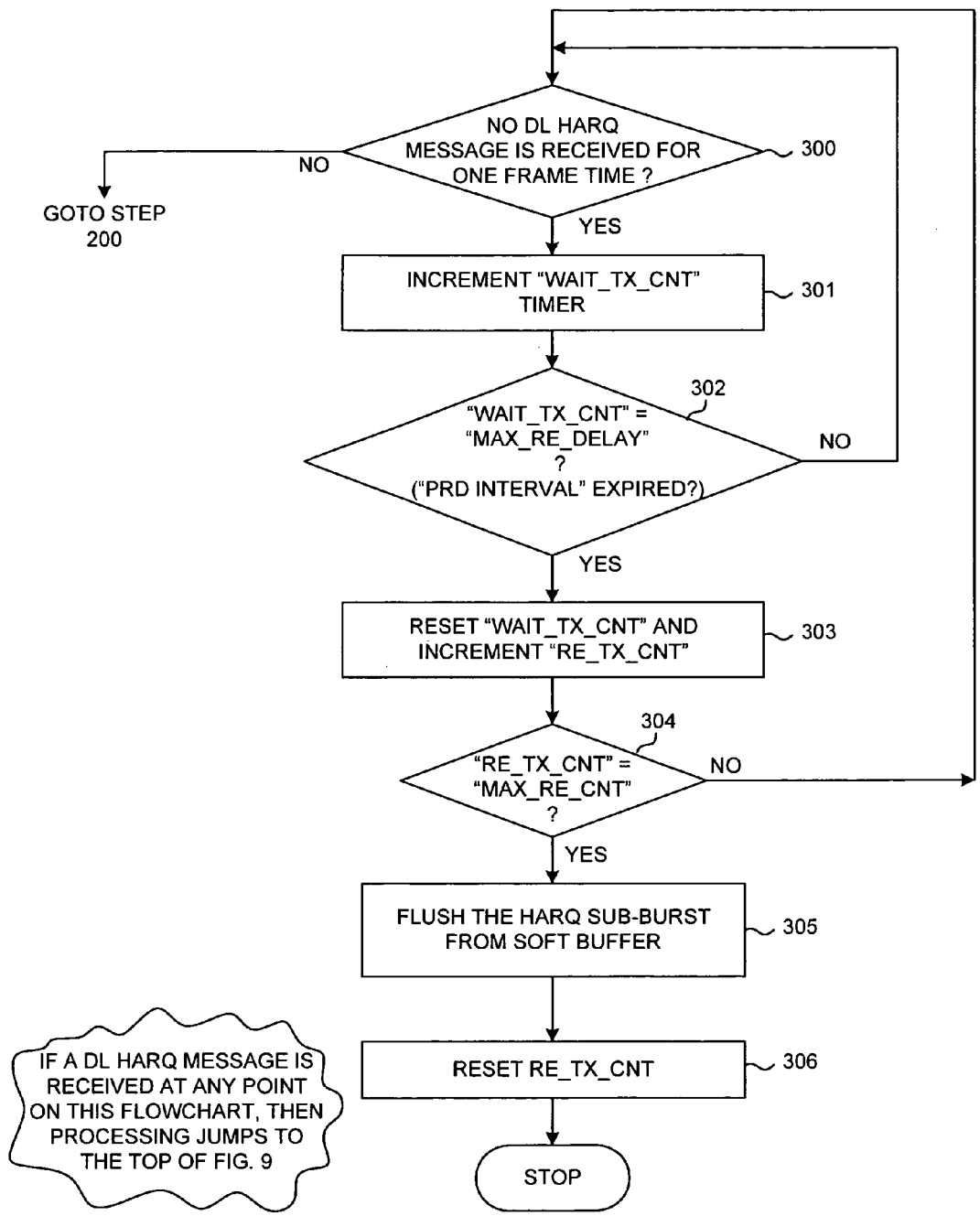

FIG. 10 is a flowchart that illustrates operation of mobile station 101 during a time that no DL HARQ message is received. If a DL HARQ message is received, then processing jumps to step 200 at the top of FIG. 9. Otherwise, as long as no DL HARQ message is received, processing continues through the steps of FIG. 10. If no DL HARQ allocation message is received for a time period of at least one frame duration (step 300), then the WAIT_TX_CNT timer is incremented (step 301). If the incremented value of the WAIT_TX_CNT timer is determined (step 302) not to have reached the MAX_RE_DELAY count value (that corresponds to the Predetermined Retransmission Delay Interval 119 of FIG. 7), then processing returns to step 300. If the incremented value of the WAIT_TX_CNT timer is determined (step 302) to have reached the MAX_RE_DELAY count value, then the WAIT_TX_CNT timer is reset and the retransmission counter RE_TX_CNT is incremented (step 303). If RE_TX_CNT is determined (step 304) to have reached the maximal retransmission count value MAX_RE_CNT, then the soft combining buffer is flushed (step 305) and RE_TX_CNT is reset (step 306). If RE_TX_CNT is determined (step 304) not to have reached MAX_RE_CNT, then processing returns to step 300.

Figure 5:
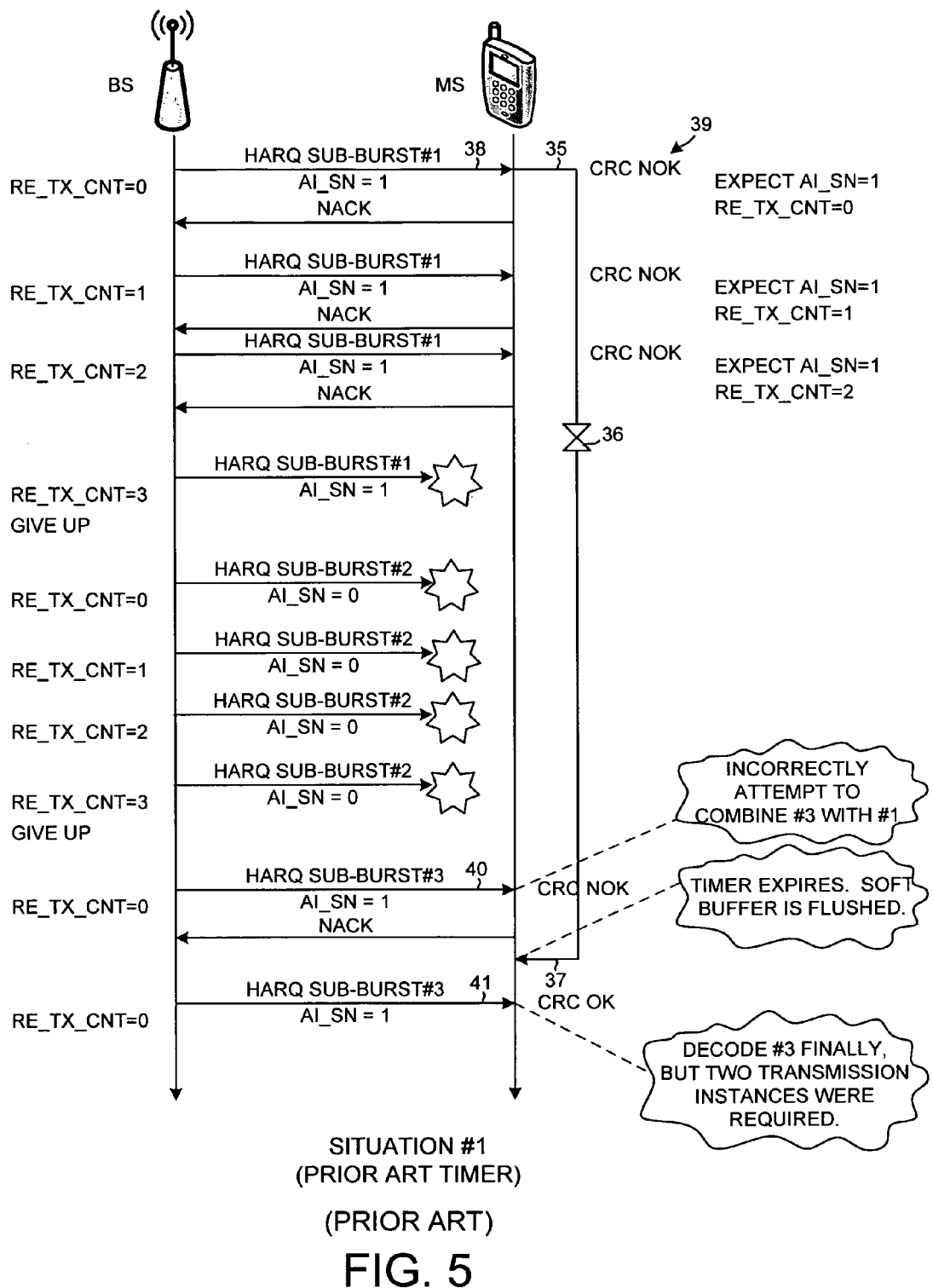
FIG. 5 (Prior Art) is a diagram that illustrates operation of a conventional mobile station timer in a first situation.
Figure 11:
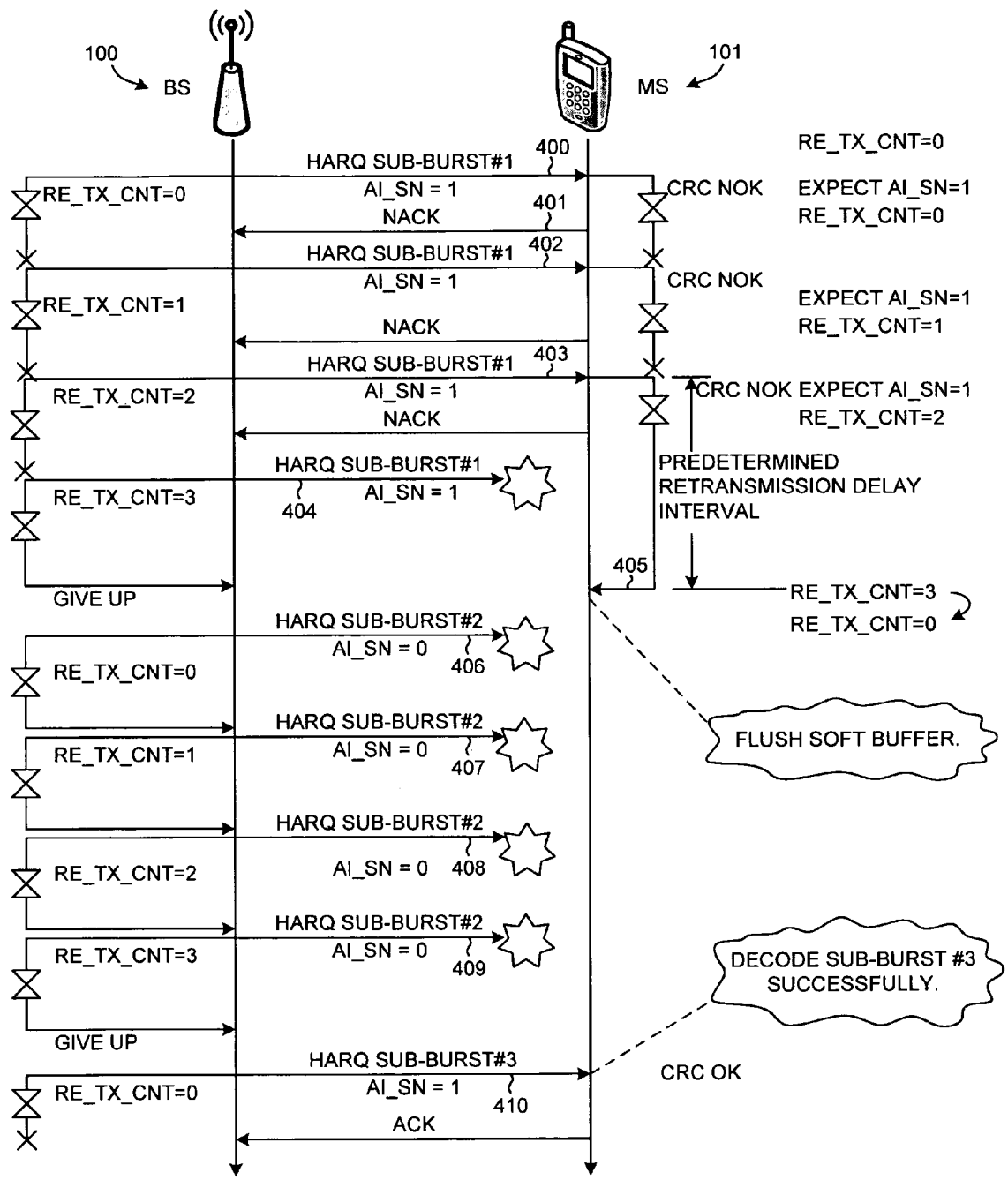
FIG. 11 is a signal diagram that illustrates how the WAIT_TX_CNT timer and the RE_TX_CNT counter operate together in the first situation to avoid the problem encountered by a conventional system in the first situation as set forth in FIG. 5.

FIG. 11 is a flowchart that illustrates how the WAIT_TX_CNT timer and the RE_TX_CNT counter operate together to prevent the erroneous soft combining problem that conventionally occurs in situation #1 illustrated in FIG. 5. Initially, the retransmission counter RE_TX_CNT in mobile station 101 has a "0" value. The first transmission 400 of sub-burst#1 is received at the mobile station, but is undecodable. Because transmission 400 is the first transmission and not a retransmission, the RE_TX_CNT is not incremented but rather remains at "0" as illustrated. The mobile station returns a NACK 401. The base station responds by sending a retransmission 402 of sub-burst #1. This retransmission too is undecodable. The mobile station therefore increments RE_TX_CNT to "1" and returns a NACK. The next retransmission 403 is also not decodable, so RE_TX_CNT is incremented to "2". The next retransmission 404 is, however, not received by the mobile station as illustrated. The WAIT_TX_CNT timer in the mobile station therefore expires after the PRD interval. The left pointing arrow 405 indicates this time out condition. Due to the WAIT_TX_CNT timer expiring, RE_TX_CNT in the mobile station is incremented to "3". The value "3" is the MAX_RE_CNT value, so the soft combining buffer is immediately flushed and RE_TX_CNT is reset to "0". As indicated in step 306 of FIG. 10, WAIT_RE_CNT is reset and is not restarted. Next, after four failed attempts 406-409 at transmitting sub-burst#2, the base station attempts to transmit a new sub-burst (sub-burst#3) in transmission 410. Even though the AI_SN value ("1") of transmission 410 is the same as the AI_SN value ("1") of the last received transmission 403, the mobile station is aware, due to the flushing event, that soft combining should not be attempted. The sub-burst#3 is successfully decoded on the first transmission of sub-burst#3.

Figure 6:
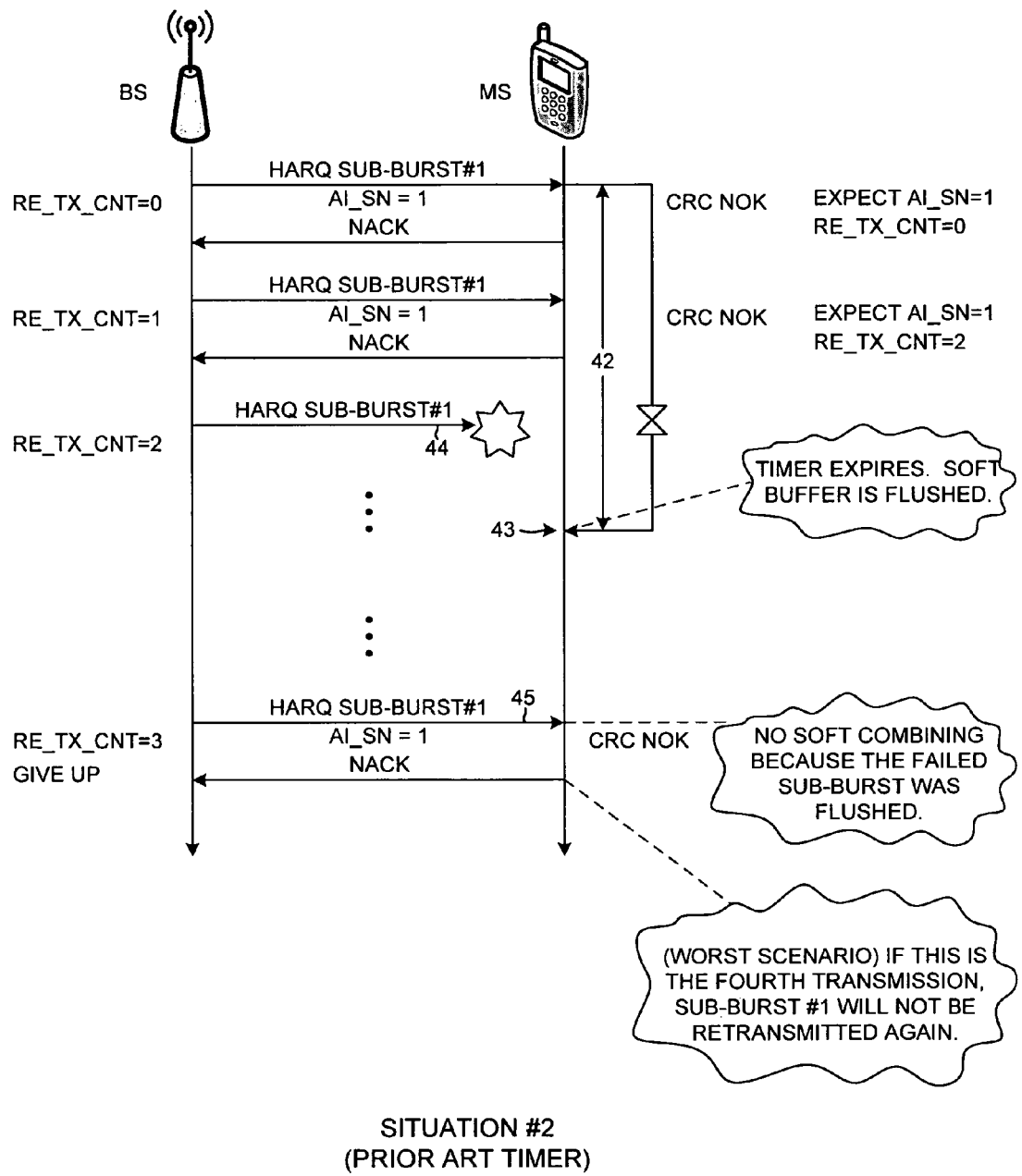
FIG. 6 (Prior Art) is a diagram that illustrates operation of a conventional mobile station timer in a second situation.
Figure 12:
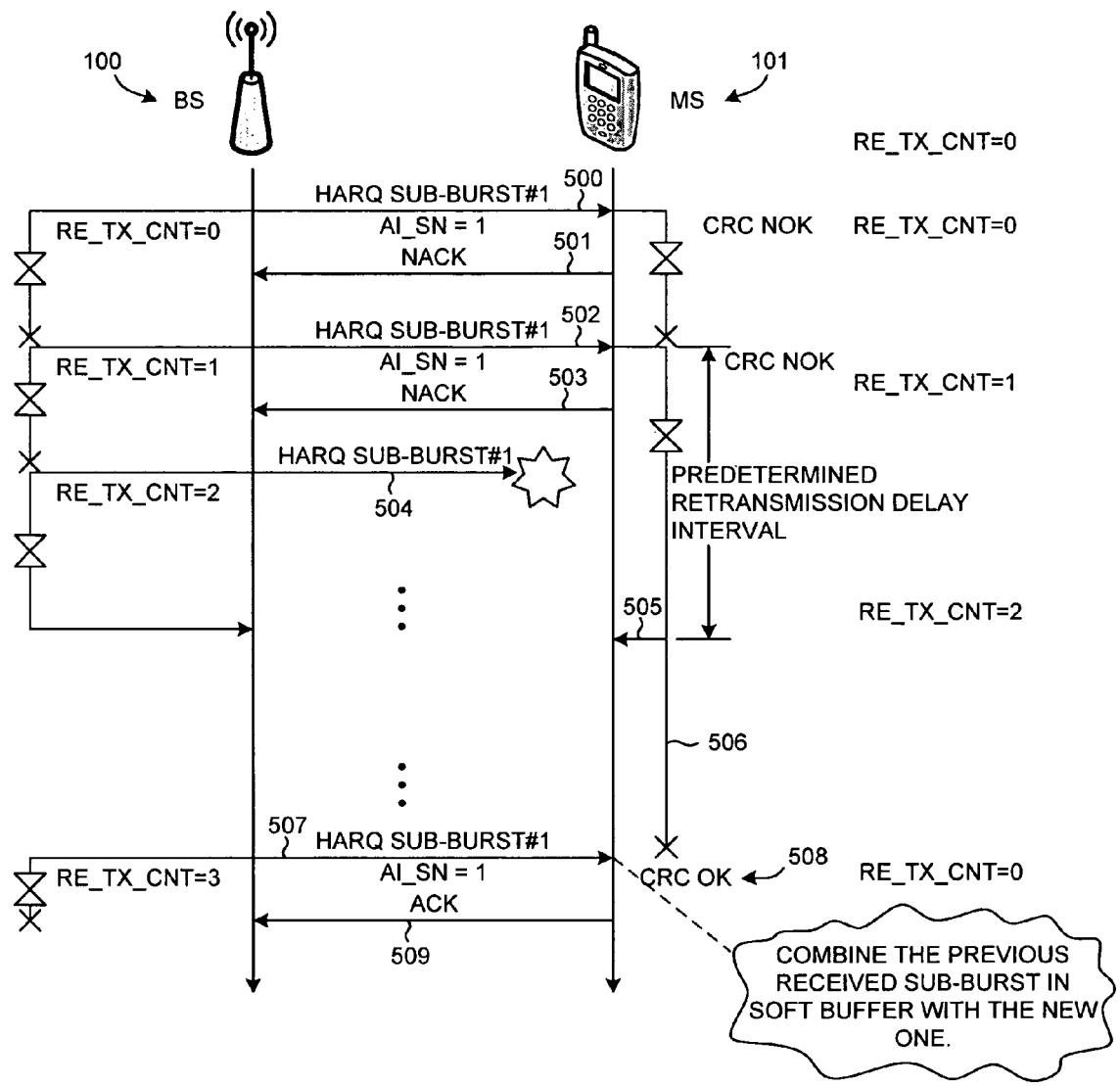
FIG. 12 is a signal diagram that illustrates how the WAIT_TX_CNT timer and the RE_TX_CNT counter operate together in the second situation to avoid the problem encountered by a conventional system in the second situation as set forth in FIG. 6.

FIG. 12 is a flowchart that illustrates how the WAIT_TX_CNT timer and the RE_TX_CNT counter operate together to prevent the erroneous soft combining problem that conventionally occurs in situation #2 illustrated in FIG. 6. Initially, the retransmission counter RE_TX_CNT in mobile station 101 has a "0" value, and the retransmission counter in the base stations has a "0" value. The first transmission 500 of sub-burst#1 from the base station is received at the mobile station, but the CRC check fails and the sub-burst is determined to be undecodable. Because transmission 500 is the first transmission of sub-burst#1 and not a retransmission, the RE_TX_CNT in the mobile station is not incremented but rather remains at "0" as illustrated. The mobile station returns a NACK 501. The base station responds by sending a retransmission 502 of sub-burst #1. This retransmission too is undecodable. The mobile station therefore increments RE_TX_CNT to "1" and returns a NACK 503. In situation #2 illustrated here, the third transmission attempt 504 is not received by the mobile station. The WAIT_TX_CNT timer therefore expires after the PRD interval as indicated by left pointing arrow 505 and the RE_TX_CNT is incremented to "2". Because RE_TX_CNT has not yet reached the MAX_RE_CNT value of "3", the WAIT_TX_CNT timer is reset and immediately restarted. The timing of WAIT_TX_CNT after being restarted is indicated by vertical line 506. In this example, before the WAIT_TX_CNT timer can expire again, the base station sends the fourth transmission attempt 507 of sub-burst#1. Soft combining of sub-burst#1 information previously stored in the soft buffer with sub-burst#1 information from transmission 507 occurs successfully, resulting in a successful CRC check 508. Mobile station 101 therefore returns an ACK 509. Accordingly, the undesirable flushing of sub-burst#1 information the soft combining buffer at time 43 in situation #2 as illustrated in the conventional operation of FIG. 6 is avoided. The novel WAIT_TX_CNT timer and the retransmission counter RE_TX_CNT operate together to prevent premature flushing of the soft combining buffer, thereby allowing successful soft combining to occur.

The above-described retransmission counter (RE_TX_CNT) mechanism and the wait transmission timer (WAIT)TX_CNT) may be implemented in the receiver as a hardware counter and a hardware timer, or as a software-implemented counter and a software-implemented timer. In the case of the software-implemented counter and timer, each of the mechanisms may involve a register or other type of sequential storage element, the contents of which is updated by software. Such a software-implemented counter mechanism or timer mechanism, therefore, also includes and involves an amount of hardware.

IEEE 802.16e Embodiment

In the above-described IEEE 802.16m compliant system of FIG. 7, a parameter (for example, the RI value or the MAX_RE_DELAY value) is negotiated between the base station and the mobile station and that parameter is then used by the mobile station to define the PRD interval. The base station can therefore set the PRD interval. In an IEEE 802.16e compliant embodiment, however, no such parameter is negotiated between the base station and the mobile station. Rather, the mobile station involves a novel timer (LOST_MAP_CNT) and itself sets the time at which this novel timer will expire. The mobile station sets the expiration time(s) of LOST_MAP_CNT without receiving any RI value or MAX_RE_DELAY value from the base station. A second difference between the IEEE 802.16m compliant embodiment of FIG. 7 and the IEEE 802.16e compliant embodiment described here is the mechanism by which the soft buffer is flushed. In the embodiment of FIG. 7, the soft combining buffer is flushed if RE_TX_CNT reaches MAX_RE_CNT as set forth in FIG. 8. In the 802.16e embodiment, however, the soft combining buffer is not flushed if the novel timer indicates that a first threshold time THR1 has been reached. Rather, the sub-burst information in the soft combining buffer is "marked" if the novel timer reaches THR1, but the marked information is not flushed. The system continues to operate. If at a later time when an additional HARQ sub-burst is to be written into the soft combining buffer such that the soft combining buffer would overflow, then at that time (for example, when the novel timer indicates a second threshold time THR2 has been reached) the previously "marked" information is flushed, thereby making room for the new HARQ sub-burst information and thereby preventing soft buffer overflow.

FIGS. 13-16 are flowcharts that illustrate operation of the IEEE 802.16e embodiment. IEEE 802.16e also employs an asynchronous HARQ retransmission scheme. The process flow of FIG. 13 occurs as long as no DL HARQ sub-burst is received onto the MS. If no DL HARQ message is received (step 600), then the "LOST_MAP_CNT" timer is incremented (step 601). If the incremented value of LOST_MAP_CNT indicates (step 602) that the first threshold time THR1 has been reached, then the soft buffer is neither flushed nor is anything in the soft buffer marked. That the first threshold time THR1 has been reached may be indicated by a count value of the LOST_MAP_CNT timer being equal to a THR1 count value.

If, however, it is determined (step 602) that the first threshold time THR1 has been reached, then processing proceeds to a determination (step 603) of whether a second threshold time THR2 has been reached. That the second threshold time THR2 has been reached may be indicated by the count value of the LOST_MAP_CNT timer being equal to a THR2 count value. If it is determined (step 603) that second threshold time THR2 has not been reached, then the current undecodable HARQ sub-burst information stored in the soft buffer is marked (step 604) or otherwise designated. The term "blur" is used here to refer to such a marked HARQ sub-burst. The base station may then transmit a new HARQ sub-burst or may continue to attempt retransmissions of the current HARQ sub-burst. If, however, it is determined (step 603) that the second threshold time THR2 has been reached, then it is determined that the soft buffer is in danger of overflowing. The marked HARQ sub-burst is flushed (step 605) from the soft buffer. How the two threshold time values THR1 and THR2 are determined is described below in connection with FIG. 14.

Figure 14:
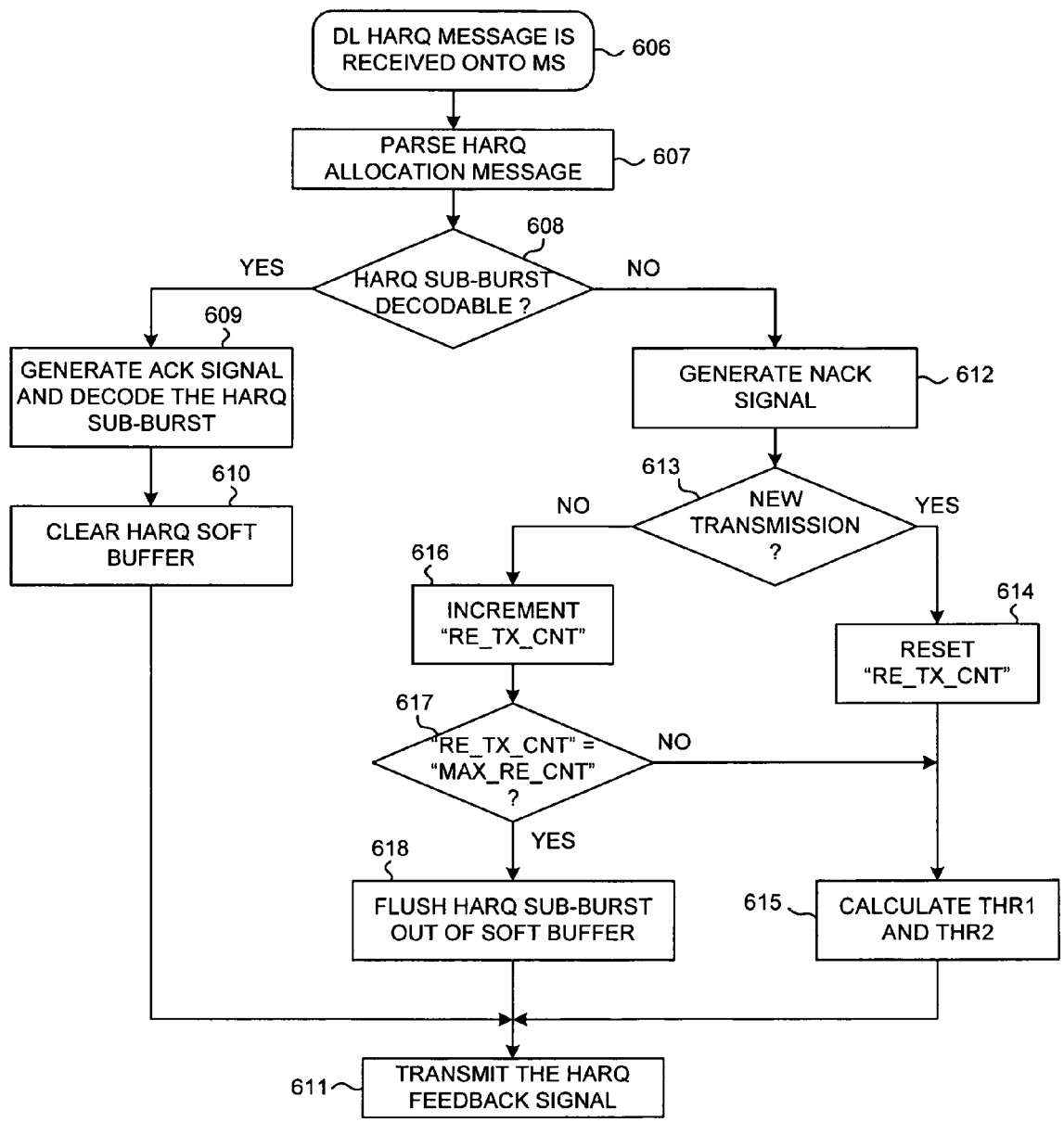
FIG. 14 is a flowchart that illustrates operation of the IEEE 802.16e embodiment in response to the receiving onto the mobile station of a DL HARQ message.

The process flow of FIG. 14 occurs in response to the receiving onto the mobile station of a DL HARQ message (step 606). The HARQ allocation message is parsed (step 607). If it is determined that the HARQ sub-burst is decodable (step 608), then an ACK is generated (step 609) and the soft buffer is cleared (step 610), and the generated HARQ feedback signal is transmitted (step 611). If it is determined (step 608) that the HARQ sub-burst is not decodable, then a NACK is generated (step 612). If the transmission is determined (step 613) to be new transmission, then RE_TX_CNT is reset (step 614) and the threshold time values THR1 and THR2 are calculated (step 615). In one example, THR1 is calculated to be equal to (MAX_RE_CNT+1−RE_TX_CNT)*MIN_INTVL, where MIN_INTVL is three frame times. If a frame time is equal to five milliseconds, then MIN_INTVL is fifteen milliseconds. THR2 is calculated to be equal to (THR1+ MAX_RE_CNT*MIN_INTVL). After calculation of THR1 and THR2 (step 615) the generated HARQ feedback signal is transmitted (step 611). The values THR1 and THR2 may be times intervals, or times, or count values that equate to time intervals, or times, depending on how the LOST_MAP_CNT timer is implemented.

If it is determined (step 613) that the transmission is not a new transmission, then RE_TX_CNT is incremented (step 616). If the incremented value of RE_TX_CNT is determined (step 617) not to be equal to MAX_RE_CNT, then THR1 and THR2 are calculated (step 615) as explained above. If, however, the incremented value of RE_TX_CNT is determined (step 617) to be equal to MAX_RE_CNT, then the HARQ sub-burst is flushed from the soft buffer (step 618). In another example there is another condition (not illustrated). The MS tentatively tags soft buffer contents in the event RE_TX_CNT is between THR1 and THR2. If the MS later determines that the soft buffer is likely going to overflow, then the MS flushes the marked buffer contents first when it flushes the soft buffer to prevent the overflow.

Figure 13:
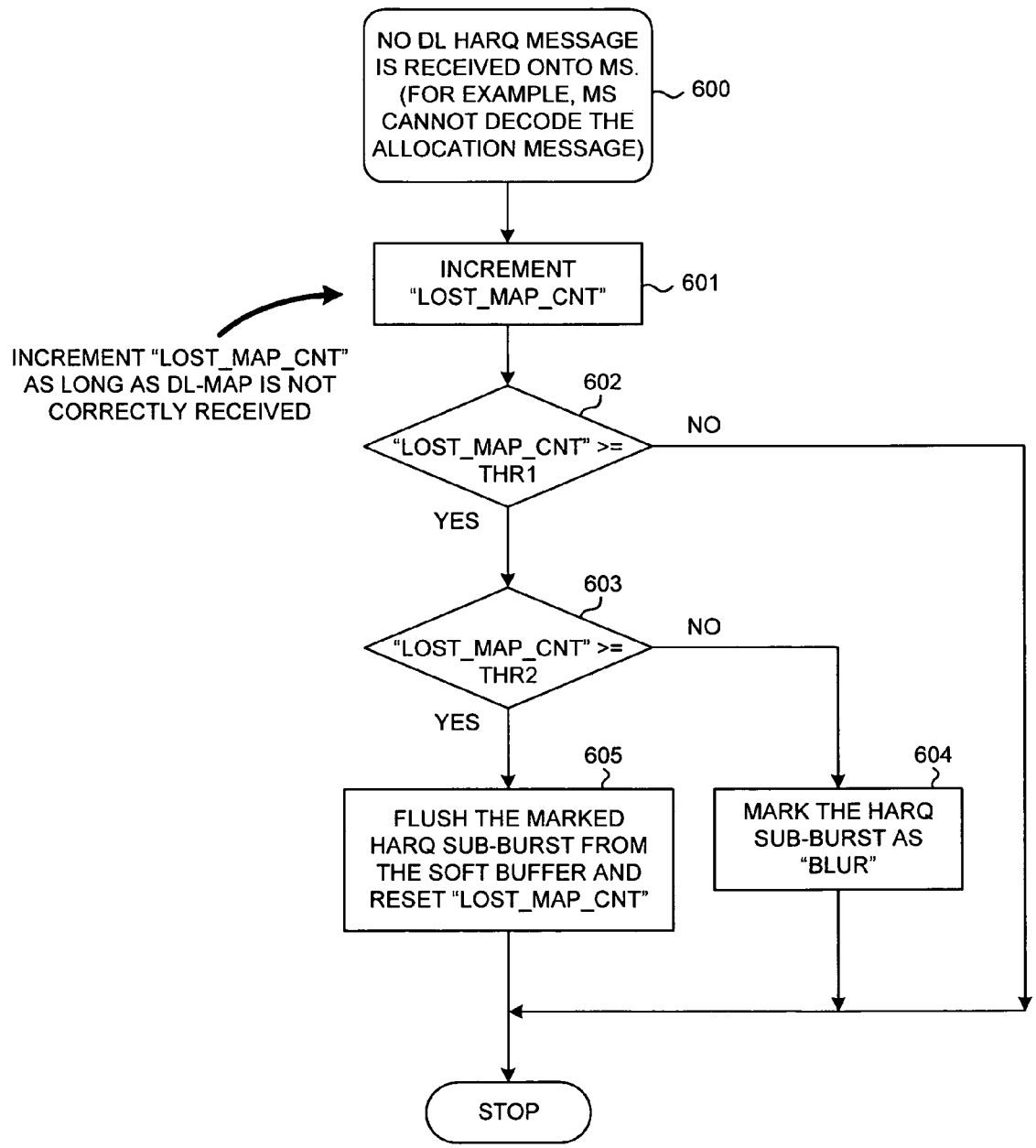
FIG. 13 is a flowchart that illustrates operation of an IEEE 802.16e embodiment during a time in which no DL HARQ sub-burst is received onto the mobile station.

In one example of a mobile station that carries out the processing of FIGS. 13 and 14, a digital baseband integrated circuit within the mobile station includes the "LOST_MAP_CNT" timer mechanism, the soft combining buffer, and a digital processor that executes instructions stored in a processor-readable medium. The processor-readable medium may, for example, be an amount of semiconductor memory that is part of the mobile station. Software stored in the memory and executed by the processor causes the processor to step through the steps of FIGS. 13 and 14. In step 611 of FIG. 14, the HARQ feedback signal is transmitted from the mobile station via a transceiver integrated circuit of the mobile station.

Figure 15:
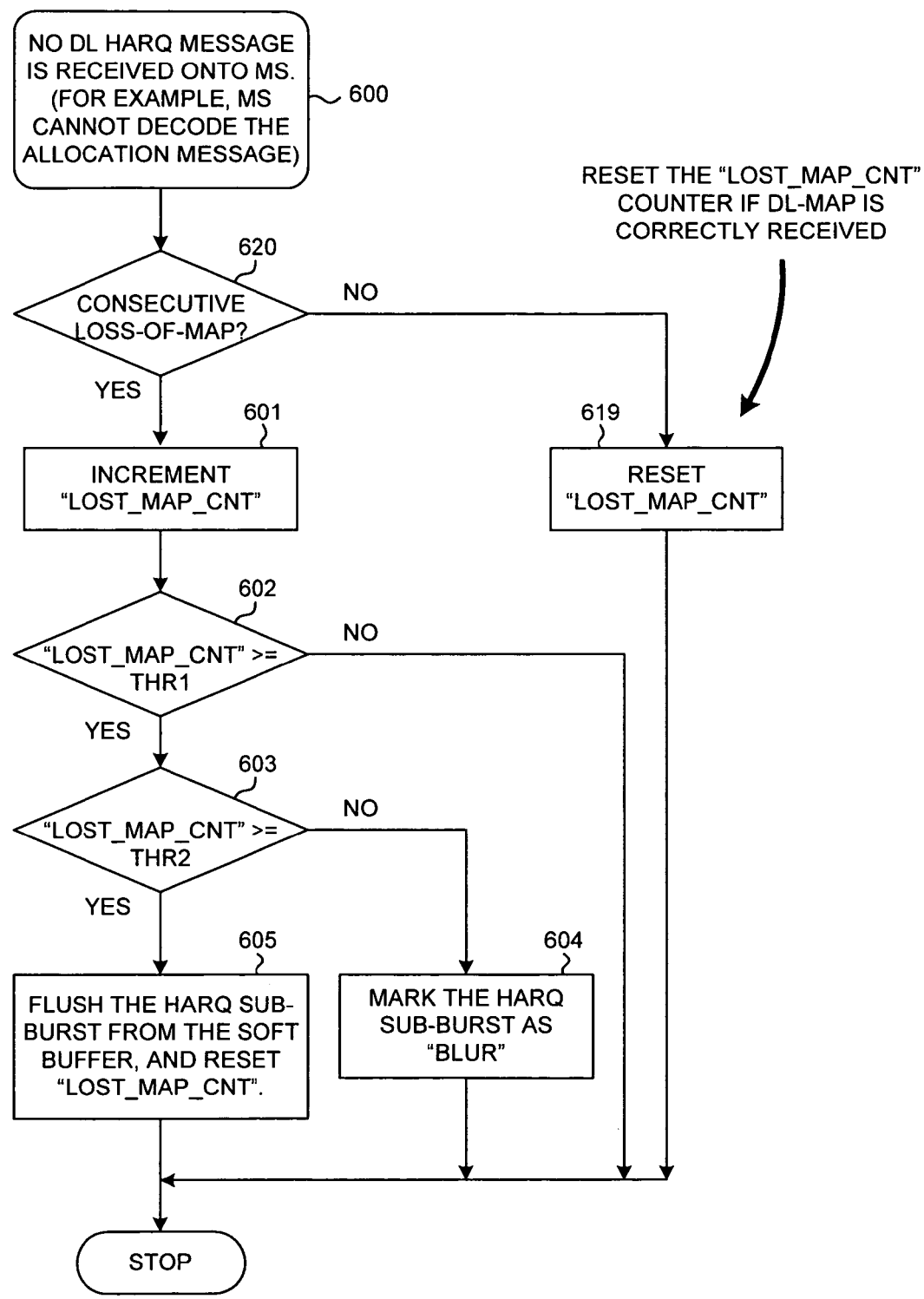
FIG. 15 is a flowchart of an alternative process flow to the process flow of FIG. 13. Rather than the process flow of FIG. 13, the process flow of FIG. 15 can be employed during a time in which no DL HARQ sub-burst is received onto the mobile station.

FIG. 15 sets forth an alternative process flow to the process flow of FIG. 13. Steps 600 and 601-605 of the process of FIG. 15 are performed in the process of FIG. 13. The same reference numerals are therefore used to denote these steps in the two FIGS. 13 and 15. In FIG. 15, however, the LOST_MAP_CNT timer is reset or cleared (step 619) if it is determined (step 620) that there has been a consecutive loss of DL-MAP.

Figure 16:
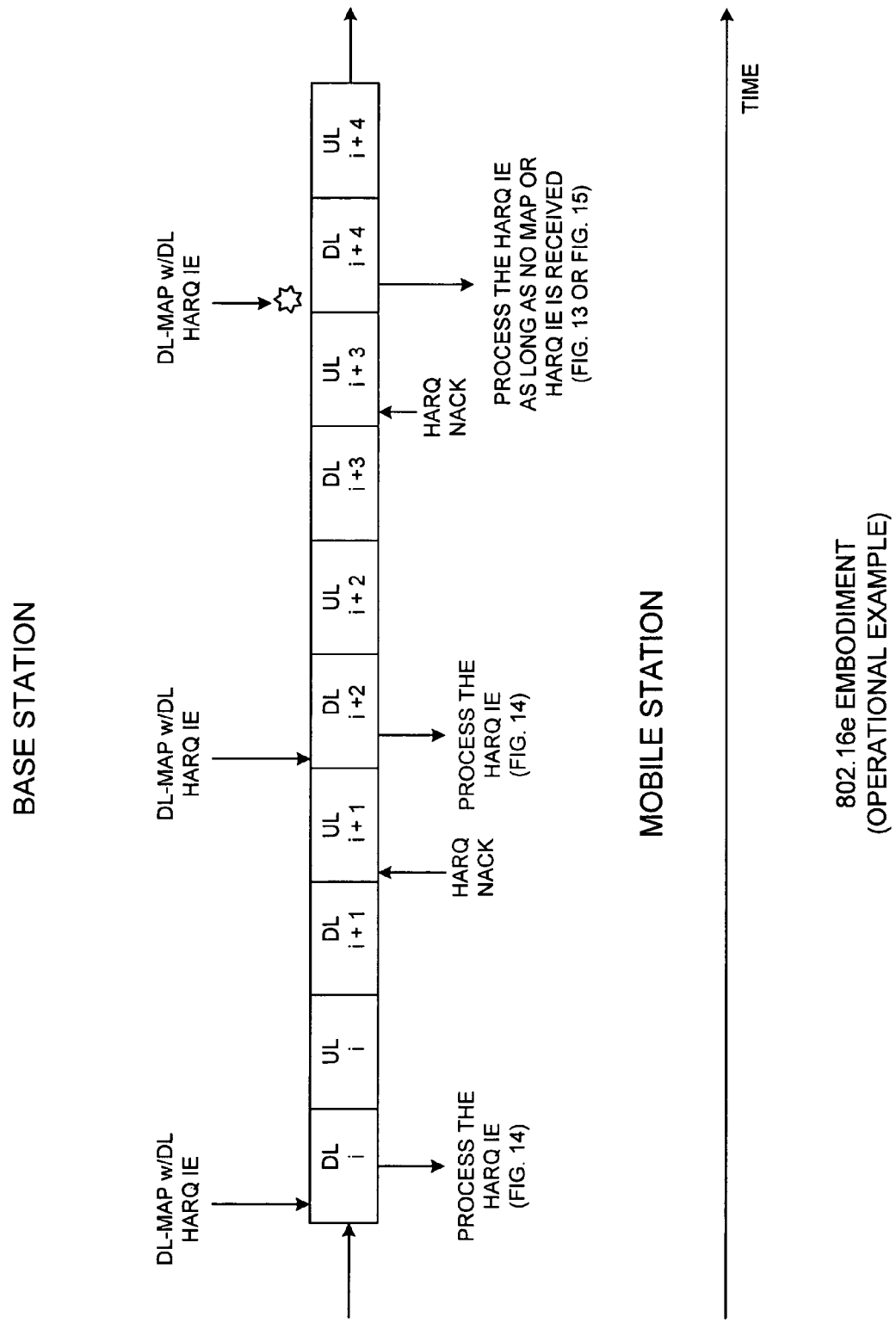
FIG. 16 is a timing diagram that illustrates an example of an IEEE 802.16e DL HARQ operation of the embodiment of FIGS. 13-15.
Figure 17:
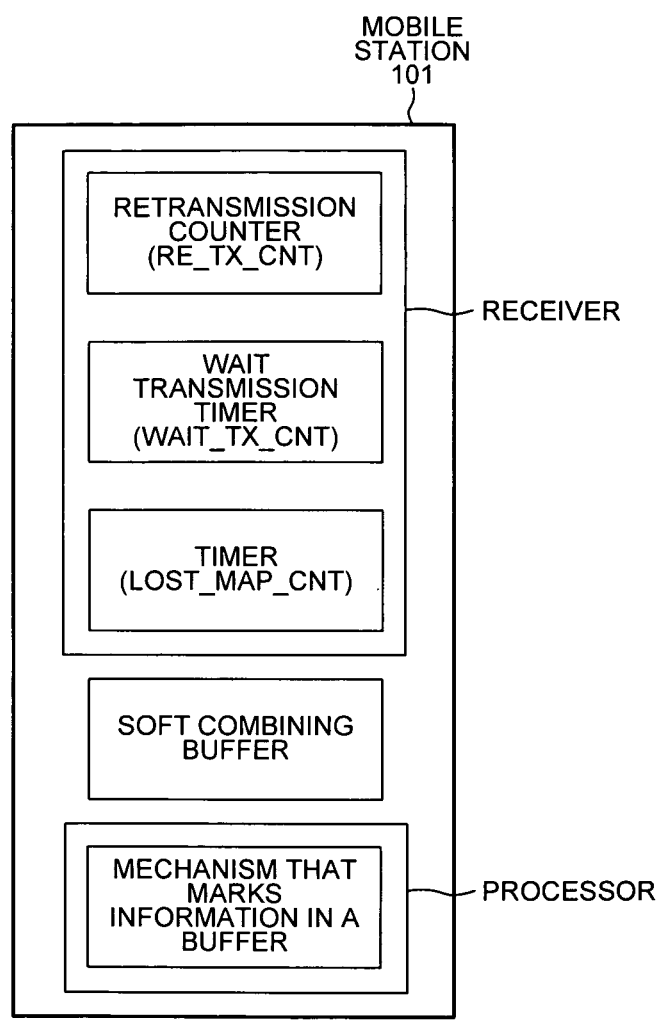
FIG. 17 illustrates elements of the mobile station of FIG. 7.

Note that FIGS. 13 and 15 depict operations performed during the time of one frame. At the beginning of each frame, the MS determines whether it should follow the steps of FIGS. 13/15 or whether it should follow the steps of FIG. 14. Accordingly, as indicated in FIG. 16, it is seen that the MS performs the action in FIG. 14 when it receives DL-MAP with the HARQ allocation IE. On the other hand, the MS performs the action in FIG. 13/15 if no DL-MAP is received.

FIG. 16 is a timing diagram that illustrates an example of an IEEE 802.16e DL HARQ operation of the embodiment of FIGS. 13-15. In the beginning in DL sub-frame (i), the base station sends a DL HARQ allocation message in a DL-MAP. The DL sub-frame (i) is denoted "DL i" in FIG. 16. Operations of the base station are set forth above the illustrated sequence of sub-frames, whereas operations of the mobile station are set forth below the illustrated sequence of sub-frames. In the example, the mobile station receives the message and returns a HARQ NACK back to the base station in UL sub-frame (i+1) due to unsuccessful HARQ decoding. The base station then attempts a retransmission in the next DL sub-frame (i+2). The mobile station receives the retransmission but again cannot successfully decode the HARQ sub-burst and returns a HARQ NACK. Next, the base station retransmits the allocation message in DL sub-frame (i+4). In this example, this retransmission is blocked. The mobile station cannot decode the allocation message so it increments its LOST_MAP_CNT counter in accordance with a process flow of FIG. 13 or FIG. 15.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) using a wait transmission counter (WAIT_TX_CNT) to determine whether a retransmission of a Hybrid Automatic Repeat ReQuest (HARQ) sub-burst has not been received within a Predetermined Retransmission Delay (PRD) interval after receipt of a last transmission of the HARQ sub-burst;
   (b) incrementing a retransmission counter (RE_TX_CNT) in response to a determination in (a) that a retransmission of the HARQ sub-burst has not been received within a PRD interval, and incrementing the RE_TX_CNT in response to receiving an undecodable retransmission of the HARQ sub-burst onto the mobile station; and
   (c) flushing a soft combining buffer if the RE_TX_CNT reaches a maximal retransmission count (MAX_RE_CNT), wherein the WAIT_TX_CNT, the RE_TX_CNT, and the soft combining buffer are maintained on a mobile station, and wherein steps (a) thru (c) occur on the mobile station; and wherein the PRD interval in (a) is an interval of time starting at the receipt by the mobile station of the last transmission of the HARQ sub-burst.

2. The method of claim 1, wherein the incrementing the RE_TX_CNT comprises a timing mechanism to track the timing of the PRD interval and the timing mechanism restarts the timing for tracking the timing of the PRD interval if the timing mechanism determines the timing reaches an end of the PRD interval.

3. The method of claim 1, wherein the PRD interval is the maximal retransmission delay interval that the WAIT_TX_CNT allows to determine whether a retransmission of a Hybrid Automatic Repeat ReQuest (HARQ) sub-burst has been received.

4. The method of claim 1, wherein the PRD interval in (a) is an interval of time starting at a time of transmission by the mobile station of a Negative ACKnowledgement (NACK).

5. The method of claim 1, wherein the WAIT_TX_CNT starts timing a PRD interval in response to the receipt of the last transmission of the HARQ sub-burst but begins incrementing at the time the mobile station transmits a Negative ACKnowledgement (NACK) of the retransmission.

6. The method of claim 1, further comprising:
   (d) resetting the RE_TX_CNT in response to receiving onto the mobile station a transmission of another HARQ sub-burst.

7. The method of claim 1, further comprising:
   (d) resetting the RE_TX_CNT in response to receiving onto the mobile station a decodable retransmission of the HARQ sub-burst.

8. The method of claim 1, wherein the flushing of (c) is a flushing of HARQ sub-burst information pertaining to the HARQ sub-burst, and wherein other HARQ sub-burst information for other HARQ sub-bursts remains stored in the soft combining buffer and is not flushed.

9. The method of claim 1, wherein the PRD interval is a time interval that is a fixed amount of time from increment to increment of the WAIT_TX_CNT.

10. The method of claim 1, wherein the PRD interval has a duration that is equal to a time duration of a number of frames.

11. The method of claim 1, wherein it is determined in (a) that a retransmission of the HARQ sub-burst was not received within a PRD interval if the WAIT_TX_CNT reaches a Maximal Retransmission Count (MAX_RE_CNT).

* * * * *